US008335577B2

(12) United States Patent
Lin et al.

(10) Patent No.: US 8,335,577 B2
(45) Date of Patent: Dec. 18, 2012

(54) METHOD OF GENERATING ADVANCED AUDIO DISTRIBUTION PROFILE (A2DP) SOURCE CODE AND CHIPSET USING THE SAME

(75) Inventors: Yu Hsiang Lin, Hsinchu (TW);
Yu-Cheng Hsieh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1372 days.

(21) Appl. No.: 11/563,735

(22) Filed: Nov. 28, 2006

(65) Prior Publication Data

US 2007/0259621 A1 Nov. 8, 2007

Related U.S. Application Data

(60) Provisional application No. 60/746,374, filed on May 4, 2006.

(51) Int. Cl.
*G06F 17/00* (2006.01)
(52) U.S. Cl. ...... 700/94; 455/41.2; 455/151.2; 455/352; 381/300; 381/309; 381/311; 381/77; 381/79; 709/230; 709/231; 709/234; 709/236; 709/237
(58) Field of Classification Search ...... 700/94
See application file for complete search history.

(56) References Cited

U.S. PATENT DOCUMENTS

| 7,606,595 | B2 * | 10/2009 | Srinivasan et al. | 455/556.1 |
| 2004/0259544 | A1 * | 12/2004 | Amos | 455/435.1 |
| 2005/0261789 | A1 * | 11/2005 | Chen | 700/94 |
| 2006/0036758 | A1 * | 2/2006 | Zhodzishsky et al. | 709/233 |
| 2006/0069457 | A1 * | 3/2006 | Malani et al. | 700/94 |
| 2006/0270347 | A1 * | 11/2006 | Ibrahim et al. | 455/41.2 |
| 2006/0274704 | A1 * | 12/2006 | Desai et al. | 370/338 |
| 2007/0015485 | A1 * | 1/2007 | DeBiasio et al. | 455/345 |
| 2007/0049196 | A1 * | 3/2007 | Hillyard et al. | 455/41.2 |
| 2007/0135046 | A1 * | 6/2007 | Kapur et al. | 455/41.2 |
| 2007/0142024 | A1 * | 6/2007 | Clayton et al. | 455/403 |
| 2007/0214402 | A1 * | 9/2007 | Heiman et al. | 714/781 |
| 2009/0176452 | A1 * | 7/2009 | Hillyard | 455/41.2 |

FOREIGN PATENT DOCUMENTS

CN 1925350 3/2007

OTHER PUBLICATIONS

English abstract of CN1925350, pub. Mar. 7, 2007.
Lee, K.H., et al.; "An Architecture and Implementation of MPEG Audio Layer III Decoder using Dual-Core DSP;" IEEE Transactions on Consumer Electronics; vol. 47; No. 4; Nov. 2001; pp. 928-933.

* cited by examiner

*Primary Examiner* — Paul McCord
(74) *Attorney, Agent, or Firm* — McClure, Qualey & Rodack, LLP

(57) ABSTRACT

A chipset for an audio player supporting Bluetooth advanced audio distribution profile (A2DP). The chipset comprises first and second processors. The first processor reads audio source data from a storage device and performs a first part of advanced audio distribution profile (A2DP) source encoding. The second processor is coupled to the first processor and performs a second part of the advanced audio distribution profile (A2DP) source encoding. The first and second processors collectively act as a Bluetooth host.

14 Claims, 13 Drawing Sheets

METHOD OF GENERATING ADVANCED AUDIO DISTRIBUTION PROFILE (A2DP) SOURCE CODE AND CHIPSET USING THE SAME

This application claims the benefit of U.S. Provisional Application No. 60/746,374, filed on May 4, 2006.

BACKGROUND OF THE INVENTION

1. Field of the Invention

The invention relates to Bluetooth advanced audio distribution profile (A2DP) and, in particular, to generating A2DP source code with at least two processors.

2. Description of the Related Art

FIG. 1 is a block diagram of a conventional chipset of an audio player. In FIG. 1, handset chipset 100 comprising a microcontroller unit (MCU) 110 and a digital signal processor (DSP) 120. The MCU 110 is used to communicate with peripherals and access an external storage device 150, such that the audio source data can be retrieved. An audio parser 130 parses retrieved the audio source data, such that the retrieved audio source data can be decoded by a subsequent audio decoder 140 in the DSP 120. The DSP 120 is typically provided with strong computing power, thus is suitable for audio decoding. The audio decoder 140 decodes the retrieved audio source data and generates an audio input to a speaker 160.

The audio player chipset acts as a Bluetooth host with a Bluetooth controller module connected thereto, such that Bluetooth communication is supported. In the Bluetooth host, software implementation typically fulfills communication protocols required for L2CAP services and application programs in a Bluetooth system. L2CAP services comprise a channel manager, a resource manager, and a L2CAP (Logic Link Control and Adaptation Protocol). The communication protocols required for applications are shown in FIG. 2. SDP (Service Discovery Protocol), AVDTP (Audio/Video Distribution Transport Protocol) and so forth are required for A2DP applications.

FIG. 3 is a schematic diagram of a conventional chipset of an audio player supporting Bluetooth A2DP. In FIG. 3, an external Bluetooth controller chip 380 with a built-in SBC encoder 360 is connected to a Bluetooth host 370 in the audio player chipset 300 via a host controller interface (HCI). The audio player chipset 300 transmits decoded pulse code modulation (PCM) audio input to the external Bluetooth controller chip 380 via a digital audio interface. After SBC encoding, the audio data is transmitted to a destination via AVDTP, L2CAP, Baseband, and so forth built into the handset chipset 300. This architecture requires a powerful Bluetooth controller chip, thus the cost of it is high.

FIG. 4 is a schematic diagram of a conventional chipset of an audio player supporting Bluetooth A2DP, a solution using a low cost Bluetooth controller chip 480. The DSP 420 performs audio decoding and generates an output signal in PCM format. The MCU 410 reads the output signal and performs SBC encoding with remaining system resources. The MCU 410 acts as a Bluetooth host 470 performing A2DP source encoding. This architecture requires a powerful MCU provided with enough remaining system resources.

BRIEF SUMMARY OF THE INVENTION

An embodiment of a chipset for an audio player supporting Bluetooth advanced audio distribution profile (A2DP) comprises a first and a second processor. The first processor reads audio source data from a storage device and performs a first part of advanced audio distribution profile (A2DP) source encoding. The second processor is coupled to the first processor and performs a second part of the advanced audio distribution profile (A2DP) source encoding. The first and the second processors collectively act as a Bluetooth host.

An embodiment of a method of generating advanced audio distribution profile (A2DP) source code, comprises reading audio source data from a storage device, performing a first part of advanced audio distribution profile (A2DP) source encoding in a first processor, and performing a second part of advanced audio distribution profile (A2DP) source encoding in a second processor.

Architecture of software implementation of advanced audio distribution profile (A2DP) source encoding in an audio player provided with multiple processors is disclosed. Resources of the multiple processors are more effectively utilized such that the advanced audio distribution profile (A2DP) is supported.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

Figure 1:
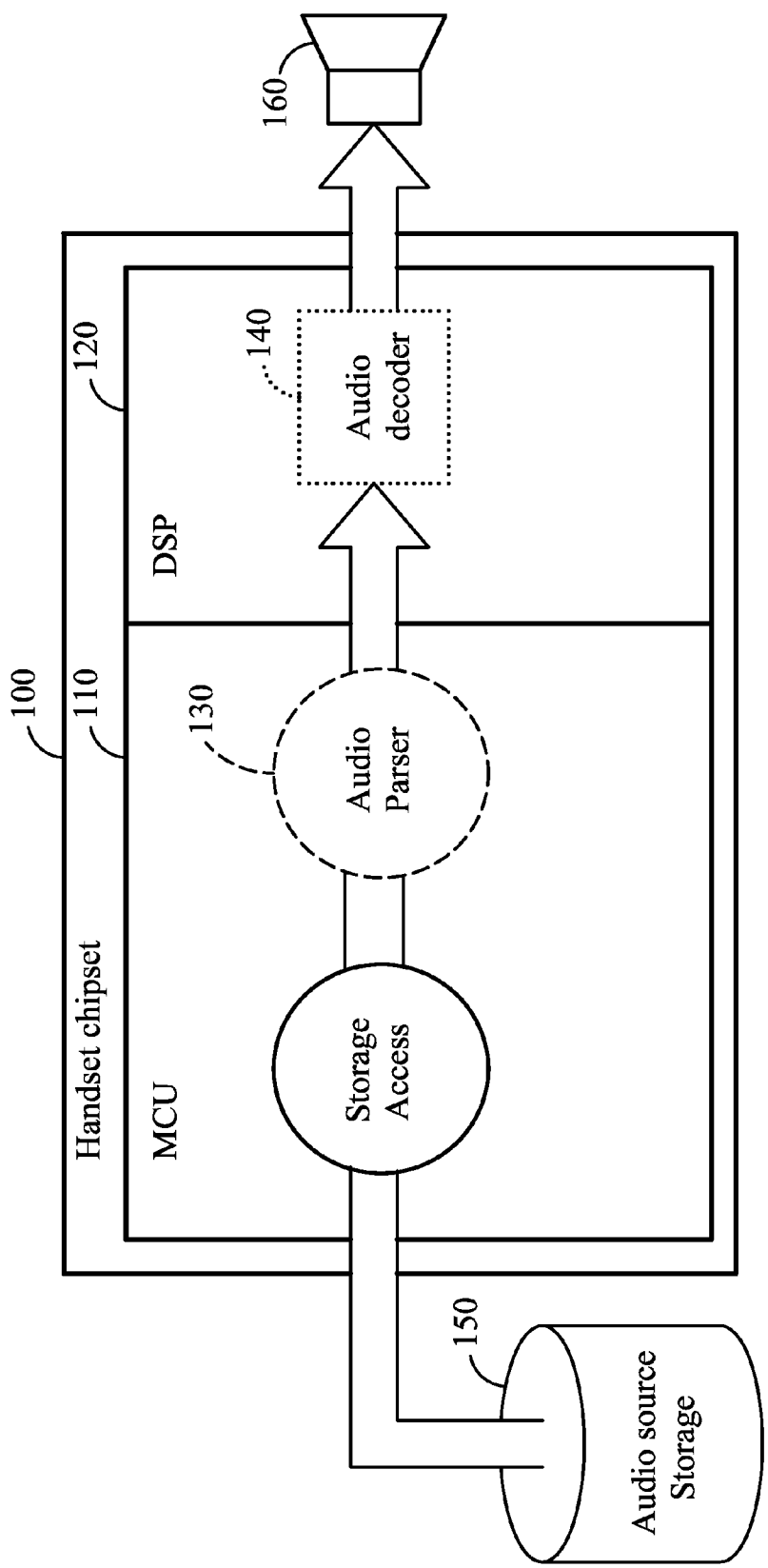
FIG. 1 is a block diagram of a conventional chipset of an audio player.
Figure 2:
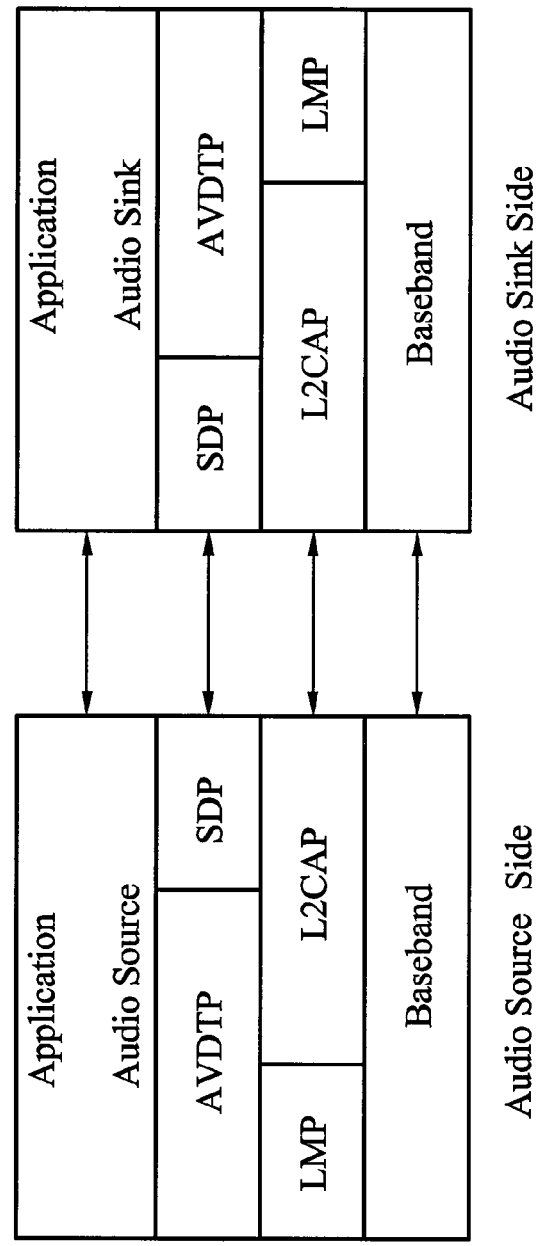
FIG. 2 is a schematic diagram of communication protocols required for applications of Bluetooth A2DP.
Figure 3:
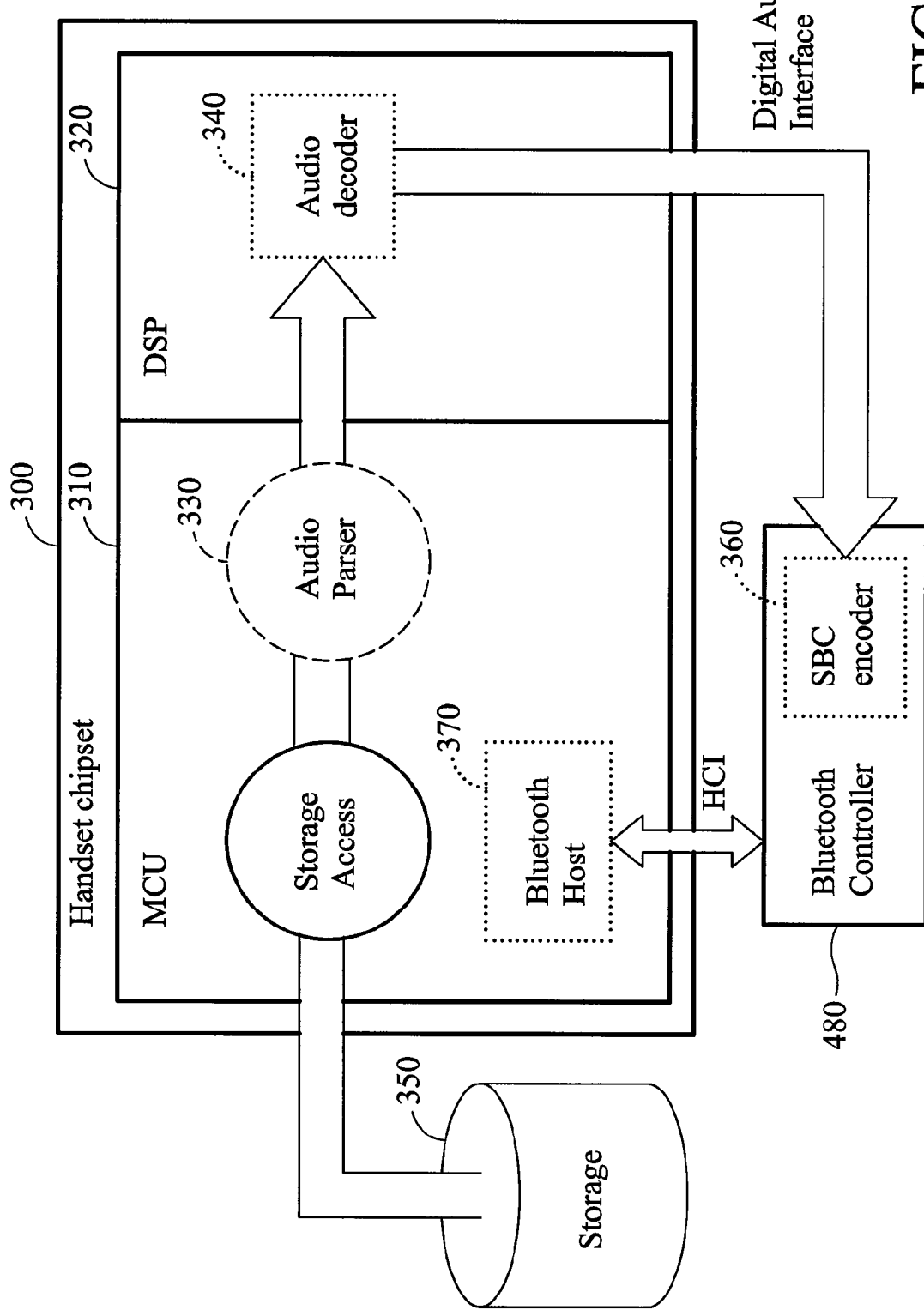
FIG. 3 is a schematic diagram of a conventional chipset of an audio player supporting Bluetooth A2DP.
Figure 4:
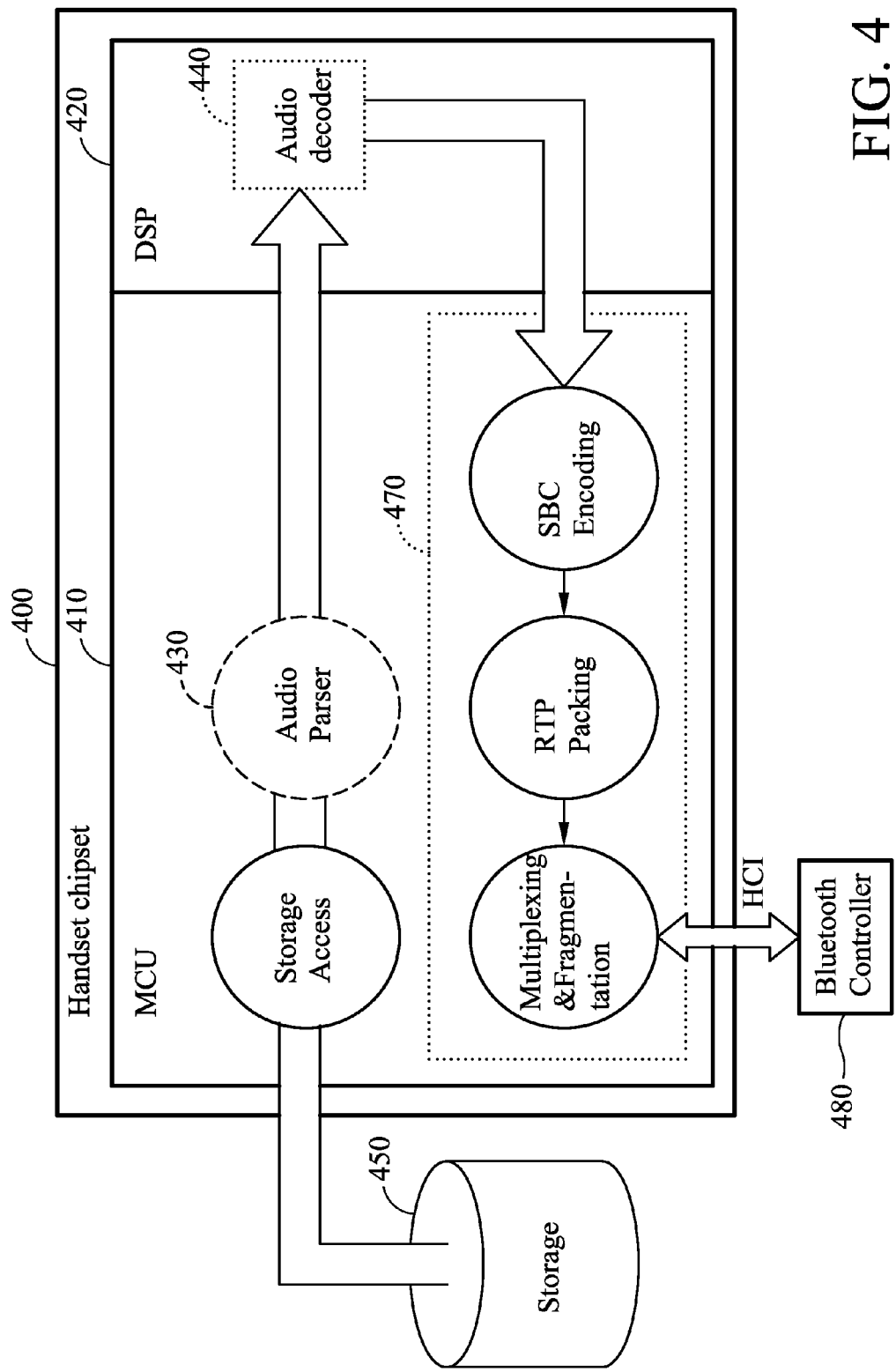
FIG. 4 is a schematic diagram of a conventional chipset of an audio player supporting Bluetooth A2DP.
Figure 5:
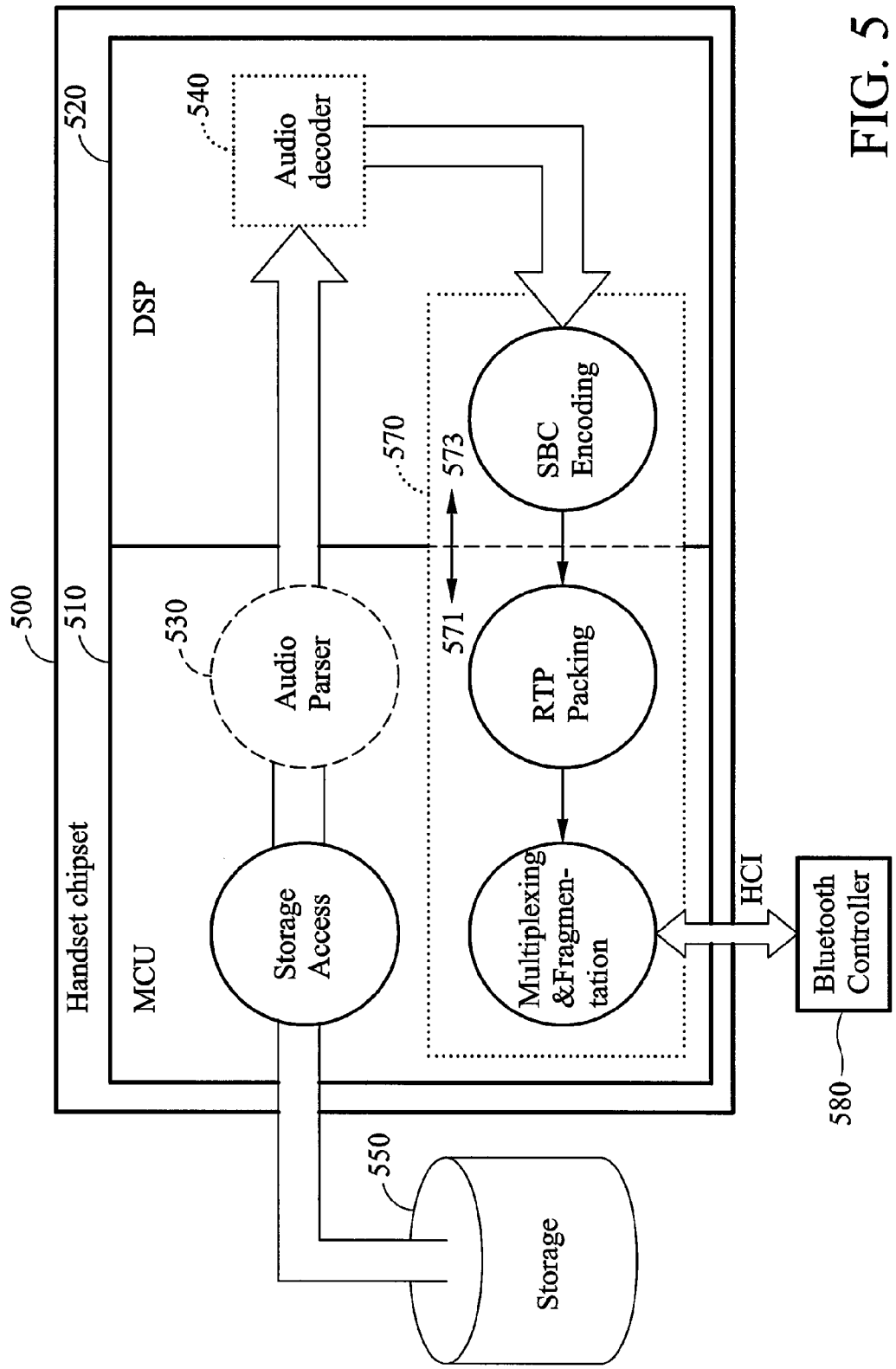
FIG. 5 is a schematic diagram of a chipset of an audio player supporting Bluetooth advanced audio distribution profile (A2DP) according to an embodiment of the invention.

FIG. 5 is a schematic diagram of a chipset of an audio player supporting Bluetooth advanced audio distribution profile (A2DP) according to an embodiment of the invention.

More specifically, the audio player may be a mobile phone. The chipset 500 comprises a first processor 510 and a second processor 520. The first processor 510 reads audio source data from a storage device 550 and performs a first part 571 of advanced audio distribution profile (A2DP) source encoding. More specifically, the storage device 550 may be a magnetic memory device, an optical memory device, a semiconductor memory, or combinations thereof. The second processor 520 is coupled to the first processor 510 and performs a second part 573 of the advanced audio distribution profile (A2DP) source encoding. Preferably, the first processor 510 is a microcontroller unit (MCU) and the second processors 520 is a digital signal processor (DSP). In addition, the chipset 500 further comprises a host controller interface HCI coupled between a Bluetooth host 570 and a Bluetooth controller 580.

The first and second processors 510 and 520 collectively act as a Bluetooth host 570 performing A2DP source encoding. Data transfer flow of A2DP source encoding is described as follows. Decoded audio source data from the audio decoder 540 undergoes SBC encoding by applications on the audio source side according to A2DP specifications. AVDTP receives the SBC encoded bit stream and generates real-time transport protocol (RTP) packets. Then, multiplexing and fragmentation of RTP packets are performed by L2CAP, thus A2DP source code is generated. Thereafter, baseband and RF modules (optional) transmit the A2DP source code to audio sink side.

Figure 6:
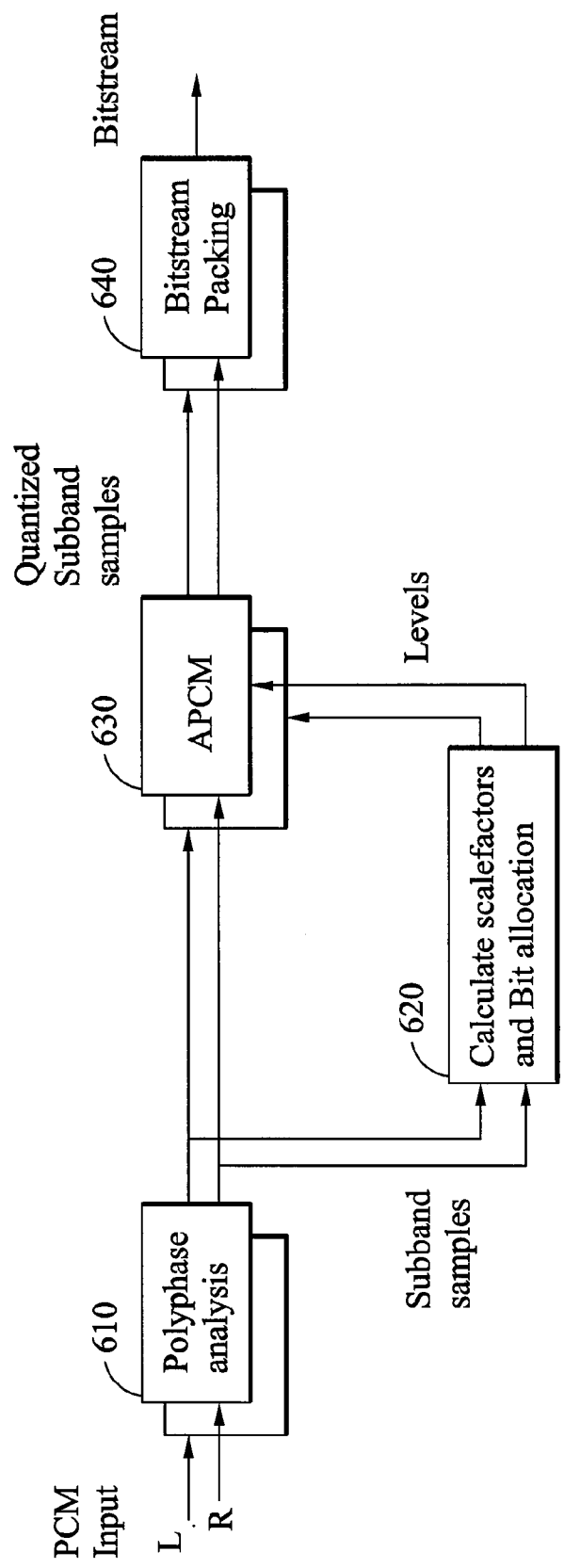
FIG. 6 is a schematic diagram of Sub-Band Coding (SBC) encoding.

There are four audio encoding schemes, Sub-Band Coding (SBC), MPEG-1, 2 Audio, MPEG-2, 4 AAC, and ATRAC family in A2DP specifications. SBC is the only encoding scheme necessarily supported. FIG. 6 is a schematic diagram of Sub-Band Coding (SBC) encoding. Compressed music files are decompressed for input in pulse coded modulation (PCM) format by an audio decoder. Polyphase analysis 610 generates sub-band samples. In step 620, scale factors are calculated according to signal characteristics of each sub-band and bit allocation of each sub-band is derived. Then, in step 630, the sub-band samples are scaled and APCM quantized. Thereafter, in step 640, the quantized sub-band samples are packed into a bit stream.

Scale factor calculation, bit allocation, APCM quantization, and bit stream packing require more program memory but less computing power. The first processor is typically provided with a larger address space and an interface for an external memory. Programs are typically executed in the external memory provided with low cost but long access cycle. Accordingly, tasks requiring large program memory but little computing power are suitable to be performed by the first processor. Thus, scale factor calculation, bit allocation, quantization, and bit stream packing are more suitable to be performed by the first processor with memory expansion via external memory peripherals.

Figure 7A:
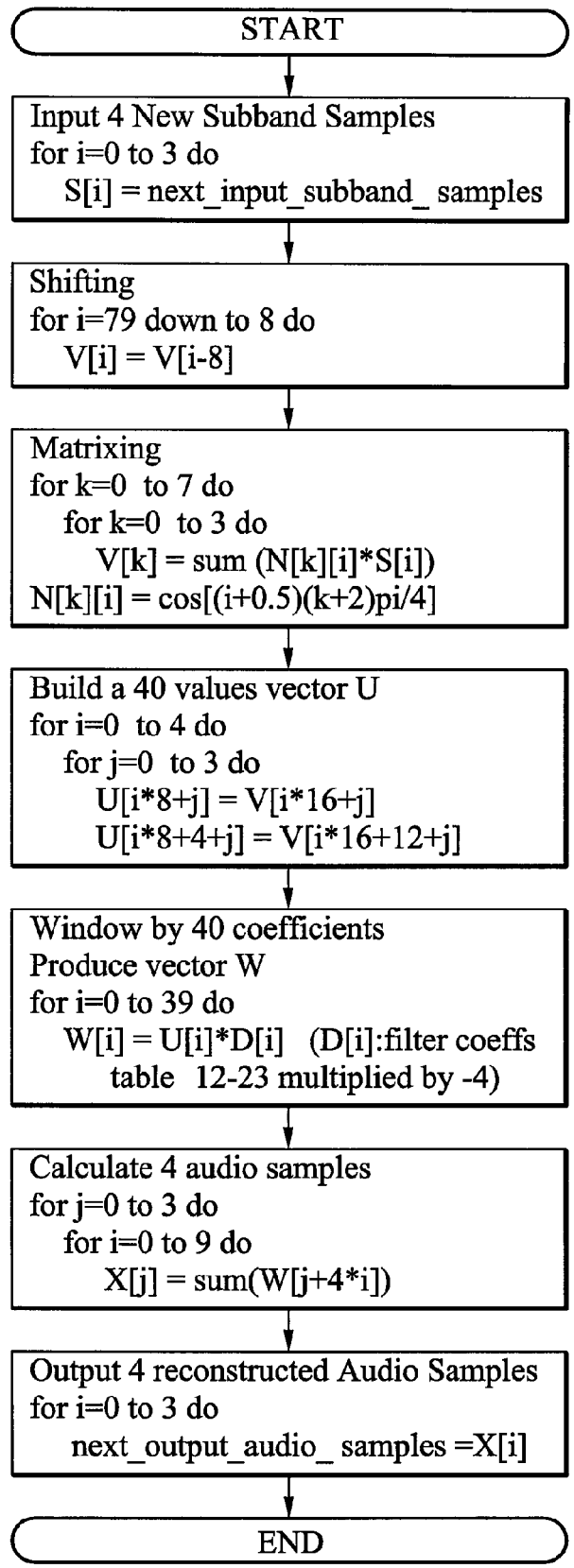
FIG. 7a is a flow diagram of polyphase analysis of Sub-Band Coding (SBC) encoding.
Figure 7B:
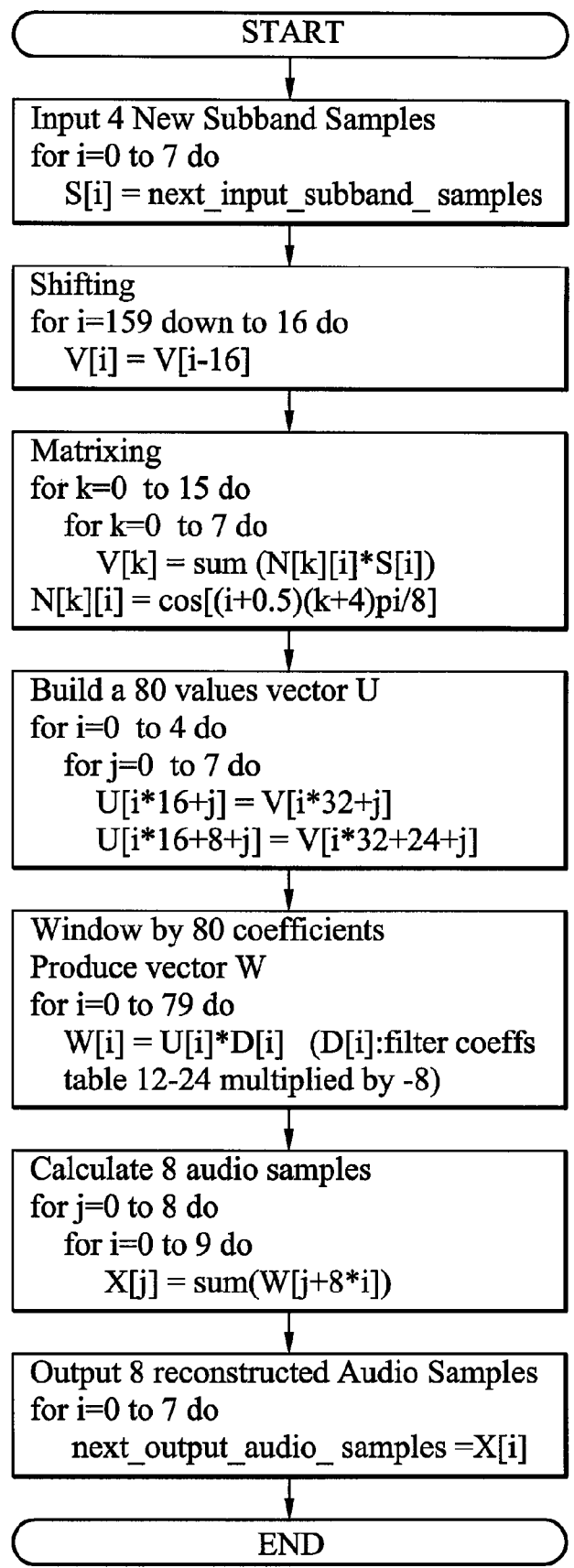
FIG. 7b is a flow diagram of polyphase analysis of Sub-Band Coding (SBC) encoding.

FIG. 7a is a flow diagram of polyphase analysis of Sub-Band Coding (SBC) encoding. FIG. 7b is a flow diagram of another polyphase analysis of Sub-Band Coding (SBC) encoding. The blocks of polyphase analysis comprise regular linear transform functions. Since processors with strong computing power typically utilize a built-in memory to perform computing to avoid computing efficiency degradation due to slow memory access, it is more efficient to implement regular linear transform functions with processors with strong computing power. Accordingly, polyphase analysis requires more computing power but less program memory and it more suitable to be performed in the second processor with strong computing power.

Figure 8:
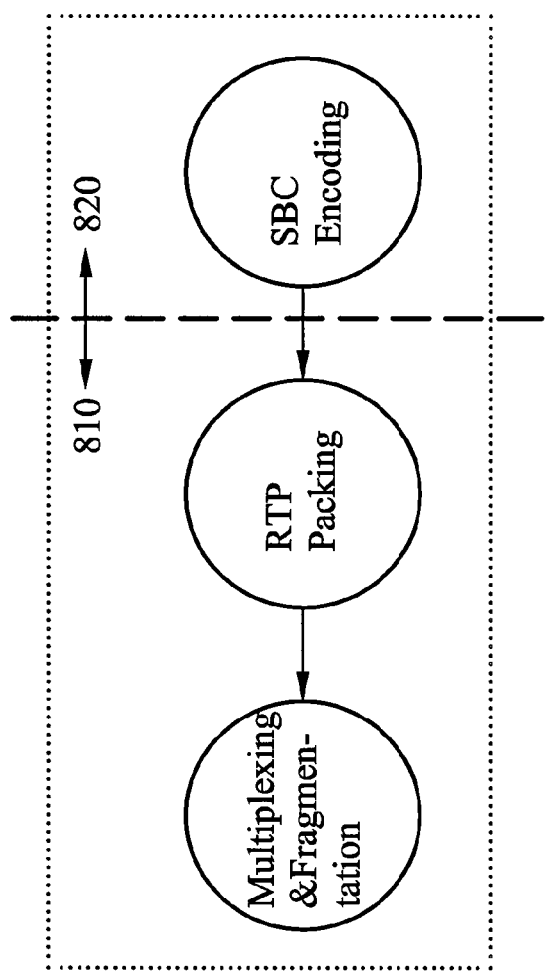
FIG. 8 is a schematic diagram of A2DP source encoding according to an embodiment of the invention.

Preferably, polyphase analysis is performed by the second processor and thus the second part of the A2DP source encoding comprises polyphase analysis of SBC encoding. FIG. 8 is a schematic diagram of A2DP source encoding according to an embodiment of the invention. In FIG. 8, the first part 810 of the A2DP source encoding performed in the first processor comprises real-time transport protocol (RTP) packing and multiplexing and fragmentation of RTP packets. The second part 820 of the A2DP source encoding performed in the second processor comprises entire SBC encoding.

Figure 9:
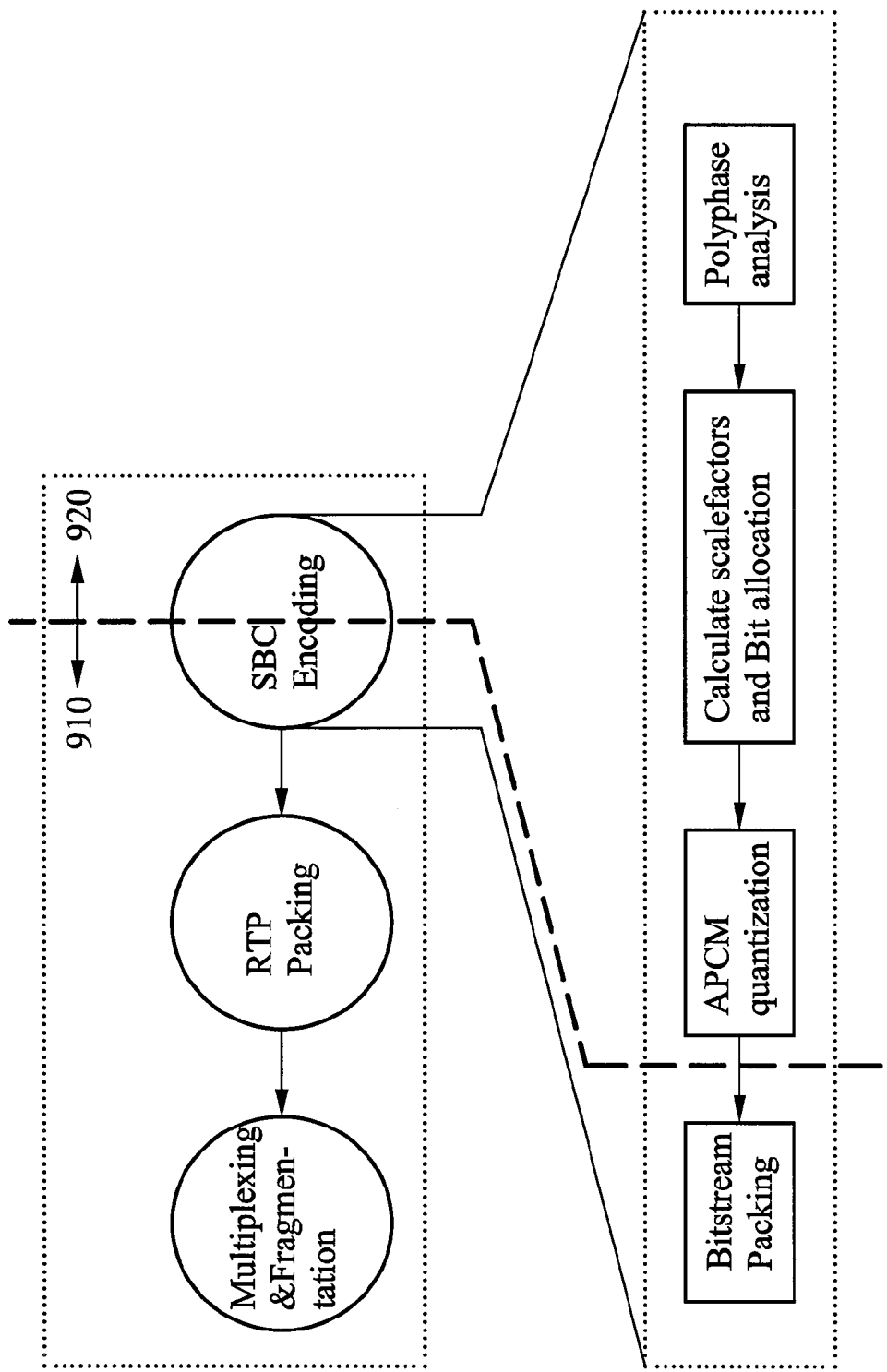
FIG. 9 is a schematic diagram of A2DP source encoding according to another embodiment of the invention.

FIG. 9 is a schematic diagram of A2DP source encoding according to another embodiment of the invention. In FIG. 9, the first part 910 of the A2DP source encoding performed in the first processor comprises not only real-time transport protocol (RTP) packing and multiplexing and fragmentation of RTP packets but also bit stream packing of subband coding (SBC) encoding. The second part 920 of the A2DP source encoding performed in the second processor comprises adaptive pulse code modulation (APCM) quantization, scale factors calculation and bit allocation, and polyphase analysis.

Figure 10:
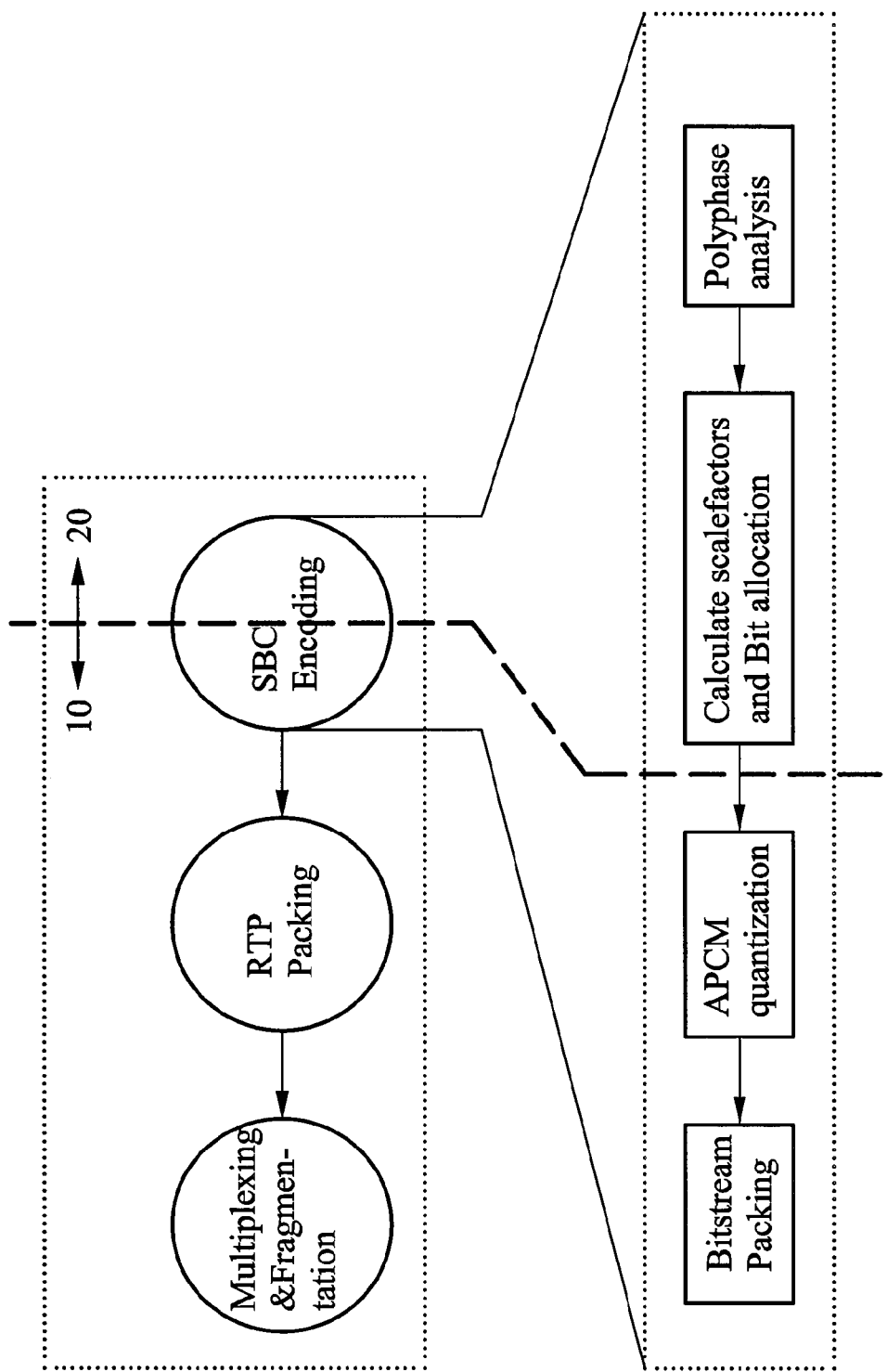
FIG. 10 is a schematic diagram of A2DP source encoding according to another embodiment of the invention.

FIG. 10 is a schematic diagram of A2DP source encoding according to another embodiment of the invention. FIG. 10 is similar to FIG. 9 and only differs in that the first part 10 of the A2DP source encoding performed in the first processor further comprises adaptive pulse code modulation (APCM) quantization of subband coding (SBC) encoding. The second part 20 of the A2DP source encoding performed in the second processor comprises scale factors calculation and bit allocation, and polyphase analysis.

Figure 11:
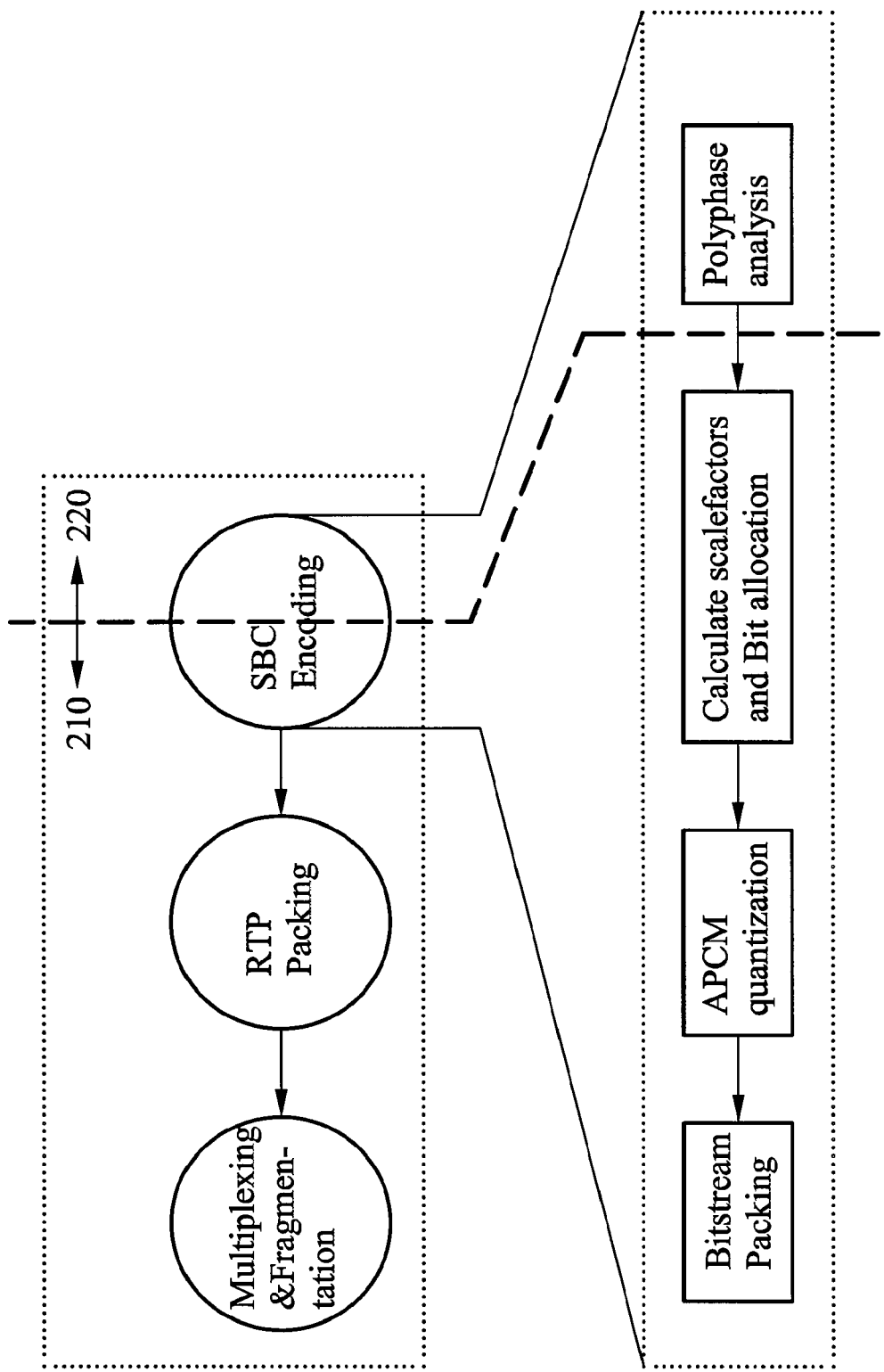
FIG. 11 is a schematic diagram of A2DP source encoding according to another embodiment of the invention.

FIG. 11 is a schematic diagram of A2DP source encoding according to another embodiment of the invention. FIG. 11 is similar to FIG. 10 and only differs in that the first part 210 of the A2DP source encoding performed in the first processor further comprises scale factors calculation and bit allocation of SBC encoding. The second part 220 of the A2DP source encoding performed in the second processor only comprises polyphase analysis.

Figure 12:
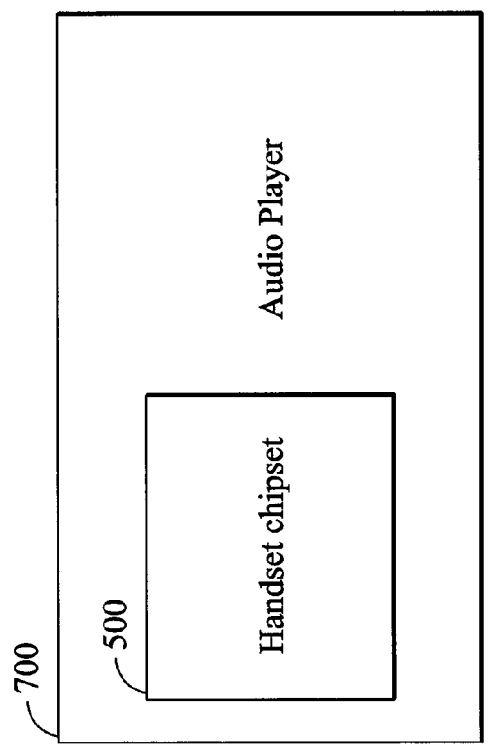
FIG. 12 is a schematic diagram of an audio player supporting Bluetooth A2DP according to an embodiment of the invention.

FIG. 12 is a schematic diagram of an audio player 700 supporting Bluetooth A2DP according to an embodiment of the invention. The audio player 700 comprises a chipset 500 as disclosed in FIG. 5.

Architecture of software implementation of advanced audio distribution profile (A2DP) source encoding in an audio player provided with multiple processors is disclosed. Resources of the multiple processors are more effectively utilized such that advanced audio distribution profile (A2DP) is supported.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A chipset for an audio player supporting Bluetooth standard advanced audio distribution profile (A2DP), comprising:
 a first processor reading audio source data from an audio source; and
 a second processor coupled to the first processor and performing a first part of the advanced audio distribution profile (A2DP) source encoding comprising at least one of the steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets on an output data of the first processor;

wherein the first processor performs a second part of advanced audio distribution profile (A2DP) source encoding comprising the other steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets on an output data of the second processor, and the first and second processors collectively act as a Bluetooth host, and wherein the first and second processors are respectively a microcontroller unit (MCU) and a digital signal processor (DSP).

2. The chipset as claimed in claim 1, wherein the audio source comprises a magnetic memory device, an optical memory device, a semiconductor memory device, or combinations thereof.

3. The chipset as claimed in claim 1, wherein the first part of the A2DP source encoding comprises polyphase analysis of SBC encoding.

4. The chipset as claimed in claim 1, further comprising a host controller interface (HCI) coupled between the Bluetooth host and a Bluetooth controller.

5. A method applied in a chipset of generating advanced audio distribution profile (A2DP) source code, comprising:
performing a first part of advanced audio distribution profile (A2DP) source encoding in a first processor; and
performing a second part of advanced audio distribution profile (A2DP) source encoding on an output data of the first processor in a second processor;
wherein the first part of the advanced audio distribution profile (A2DP) source encoding comprises at least one of the steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets, the second part of advanced audio distribution profile (A2DP) source encoding comprises the other steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets, and the first and second processors are respectively a digital signal processor (DSP) and a microcontroller unit (MCU).

6. The method as claimed in claim 5 wherein the step of performing a first part of advanced audio distribution profile (A2DP) source encoding in a first processor comprising:
reading audio source data from an audio source; and
performing the first part of advanced audio distribution profile (A2DP) source encoding on the audio source data in the first processor.

7. The method as claimed in claim 6, wherein the audio source comprises a magnetic memory device, an optical memory device, a semiconductor memory device, or combinations thereof.

8. The method as claimed in claim 5, wherein the second part of the A2DP source encoding comprises real-time transport protocol (RTP) packing and multiplexing and fragmentation of RTP packets.

9. The method as claimed in claim 8, wherein the second part of the A2DP source encoding further comprises bit stream packing of sub band coding (SBC) encoding.

10. The method as claimed in claim 9, wherein the second part of the A2DP source encoding further comprises APCM quantization of sub band coding (SBC) encoding.

11. The method as claimed in claim 10, wherein the second part of the A2DP source encoding further comprises scale factor calculation and bit allocation of SBC encoding.

12. The method as claimed in claim 5, wherein the first part of the A2DP source encoding comprises polyphase analysis of SBC encoding.

13. A chipset for an audio player supporting Bluetooth standard advanced audio distribution profile (A2DP), comprising:
a first processor performing a first part of advanced audio distribution profile (A2DP) source encoding; and
a second processor coupled to the first processor and performing a second part of the advanced audio distribution profile (A2DP) source encoding on an output data of the first processor;
wherein the first and second processors collectively act as a Bluetooth host;
wherein the first part of the advanced audio distribution profile (A2DP) source encoding comprises at least one of the steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets, the second part of advanced audio distribution profile (A2DP) source encoding comprises the other steps of a sequence of polyphase analysis of sub band coding (SBC) encoding, scale factor calculation and bit allocation of SBC encoding, APCM quantization of SBC encoding, bit stream packing of SBC encoding, real-time transport protocol (RTP) packing, and multiplexing and fragmentation of RTP packets, and the first and second processors are respectively a digital signal processor (DSP) and a microcontroller unit (MCU).

14. The method as claimed in claim 13, wherein the second part of the A2DP source encoding comprises real-time transport protocol (RTP) packing and multiplexing and fragmentation of RTP packets.

* * * * *